May 28, 1929.　　　A. C. THOMANN　　　1,714,646
SHOCK ABSORBER
Filed Jan. 25, 1928　　2 Sheets-Sheet 1
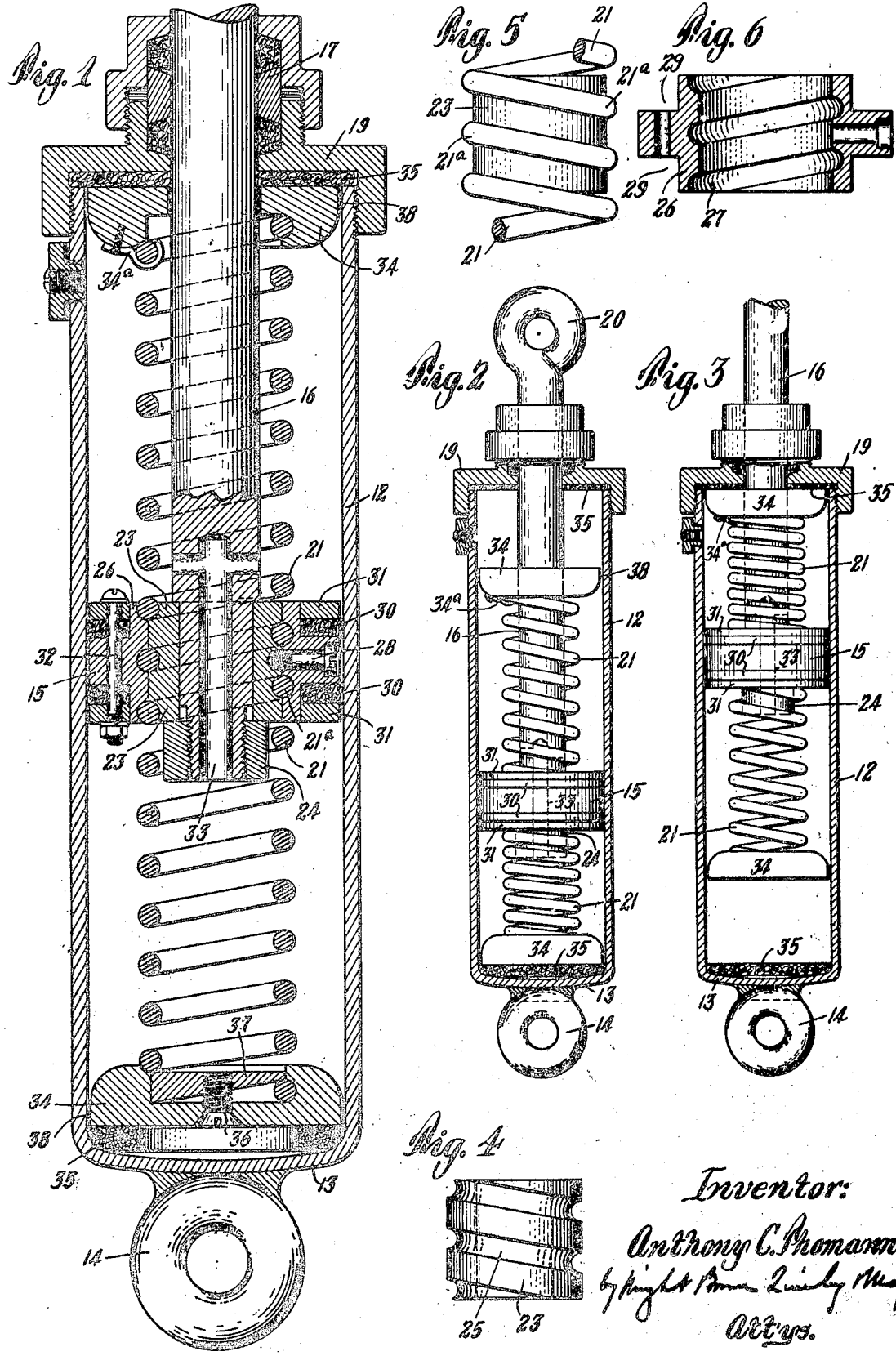
Inventor:
Anthony C. Thomann.

May 28, 1929.                A. C. THOMANN                1,714,646
                              SHOCK ABSORBER
                           Filed Jan. 25, 1928          2 Sheets-Sheet 2
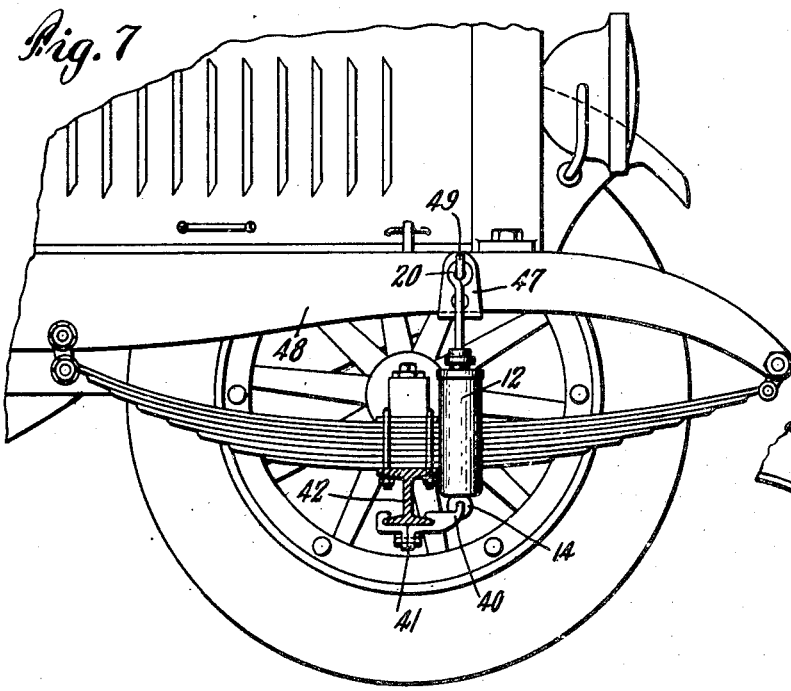
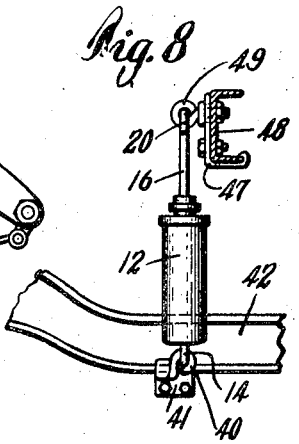
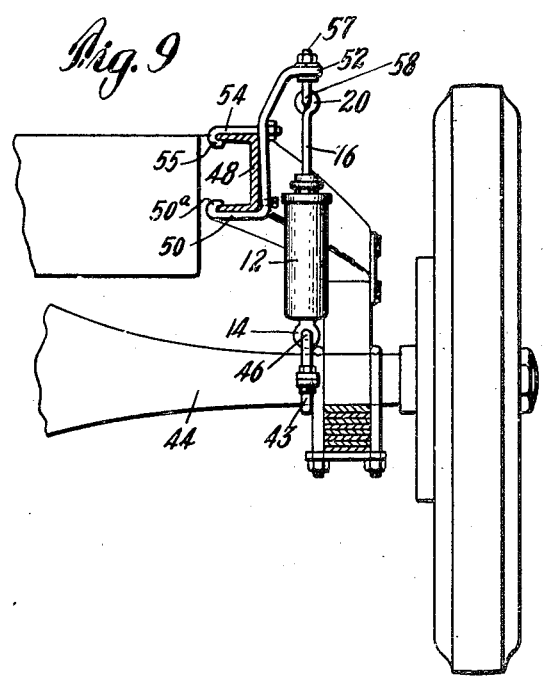
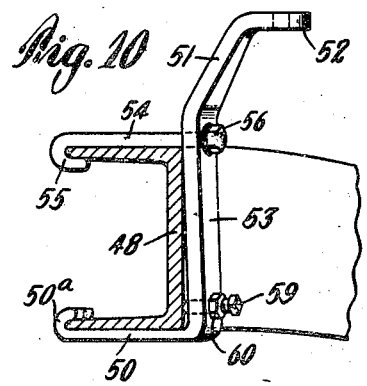
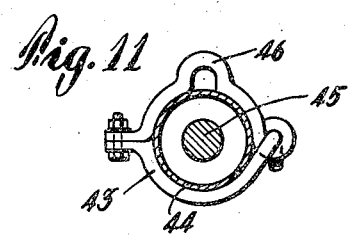
Inventor:
Anthony C. Thomann Patented May 28, 1929.

1,714,646

UNITED STATES PATENT OFFICE.

ANTHONY C. THOMANN, OF BOSTON, MASSACHUSETTS.

SHOCK ABSORBER.

Application filed January 25, 1928. Serial No. 249,236.

This invention relates to a shock-absorber of the cylinder and piston type, the cylinder containing a suitable non-freezing liquid, which is transferable from side to side of the piston, the cylinder and piston being connected with relatively movable elements of the vehicle in such manner that road vibrations and other shocks and jars cause the transference of the liquid and are absorbed or minimized.

The invention is embodied in the improvements hereinafter described and claimed.

Of the accompanying drawings forming a part of this specification,—

Figure 1 is a longitudinal section of a shock absorber embodying the invention.

Figures 2 and 3 are views similar to Figure 1, showing different relative positions of the cylinder and the piston, and the parts carried by the latter.

Figure 4 is a side view of the hub member of the piston.

Figure 5 is a side view, showing the hub member of the piston, and the midlength portion of the resilient helically coiled member, hereinafter described.

Figure 6 is a sectional view of the annular body member of the piston.

Figures 7 to 11, inclusive, show means for connecting the cylinder and piston with an axle and a chassis frame.

The same reference characters indicate the same parts in all of the figures.

The cylinder 12 is closed at one end by a head 13, provided with a member of an anchoring device, whereby the cylinder may be anchored to an element of the vehicle, such as an axle, said member being, in this instance, an eye 14, adapted to engage a complemental member of the anchoring device fixed to an axle.

The piston is designated as a whole, by 15, and the preferred construction thereof is shown by Figures 1, 4, 5 and 6.

The piston-rod 16 is fixed to the piston and is movable in a stuffing-box 17, on the head 19 of the cylinder. The outer end of the rod is provided with a member of an anchoring device, whereby the rod may be anchored to an element of the vehicle, such as the spring-supported chassis frame, said member being, in this instance, an eye 20, adapted to engage a complemental member of the anchoring device, fixed to the chassis frame.

It will be understood, however, that the cylinder may be anchored to the chassis frame, and the piston-rod to an axle, if desired.

The shock-absorber comprises a pair of retarding springs within the cylinder, said springs being anchored to the piston and projecting from opposite sides thereof, toward the heads of the cylinder. The springs are preferably the free end portions of an elongated helically coiled resilient member 21, the midlength portion of which extends through, and is anchored in the piston, so that the free portions of the springs are rigidly connected with each other and with the piston, by said midlength portion.

The piston is provided with a helical bore, which receives and closely fits a midlength convolution or convolutions 21ᵃ of the member 21, two or three of such convolutions being sufficient. Said helical bore may be provided, and the convolutions 21ᵃ engaged therewith, as next described.

The piston includes an annular hub member 23, which is fixed to the piston-rod by a nut 24, as shown by Figure 1. In the external surface of the hub member is formed a helical groove 25 (Figure 4), conforming to the convolutions of the member 21, when the same are normally spaced apart. The helical member 21 is screwed upon the hub member until its midlength convolutions 21ᵃ engage the groove 25, as shown by Figure 5. The piston includes also an annular body member 26, embracing the hub member, and provided in its inner surface with a helical groove 27, complemental to the groove 25. The body member 26 is screwed upon the helical member 21, when the hub has been engaged therewith, until the grooves 25 and 27 register with each other and form the above-mentioned helical bore. The body 26 is then positively connected with the hub 23, by the screw 28, as shown by Figure 1.

The piston is preferably formed to have a close sliding fit on the wall of the cylinder. To insure a close fit, I reduce the periphery of the body member 26, to form peripheral recesses 29 (Figure 6) at opposite sides of a narrow peripheral portion of the body member, and insert in said recesses annular compressible packing washers 30, and annular clamping washers 31, said washers 30 being secured, and the clamping washers adjusted to press the outer margins of the packing washers against the cylinder wall, by bolts 32, as shown by Figure 1.

A restricted flow of liquid from side to side of the piston is permitted, preferably by a longitudinal passage 33 (Figure 1), formed in the portion of the piston-rod which extends through the piston, said passage communicating with the liquid-holding spaces at opposite sides of the piston.

Fixed to the outer ends of the retarding springs are retarding heads 34, which are held by the springs in separable contact with the cylinder heads, or, as here shown, against compressible facings 35 on the inner surfaces of said heads, when the piston is at the midlength of the cylinder, as shown by Figure 1, the retarding springs being under sufficient tension to maintain the retarding heads in the positions shown by Figure 1. As shown by Figure 1, one of the heads 34 may be secured by a clip 34a to an end convolution of one of the retarding springs, the other head 34 being secured by a screw 36, and clamping washer 37 to an end convolution of the other retarding spring. The retarding heads are formed to permit a flow of liquid between their peripheries and the cylinder wall, of less volume than the flow permitted through the rod passage 33, the peripheries of said heads being in this instance, separated from the cylinder wall by narrow crevices 38.

When the vehicle is running without road vibrations, the relative positions of the parts of the shock-absorber are as shown by Figure 1, and there is no considerable flow of liquid through the passage 33.

When the relative positions of the cylinder and piston are changing to decrease the distance between the piston and the lower head of the cylinder, as indicated by Figure 2, the lower retarding spring is compressed, a given volume of liquid flows upward through the passage 33, into the space between the piston and the upper retarding head 34, said retarding head is depressed by the upper retarding spring, and a smaller volume of liquid flows through the upper crevice 38 into the space between the upper retarding head and the head 19 of the cylinder. The restriction of the flow through the upper crevice 38, causes the upper retarding head to become a factor in checking the downward movement of the piston relative to the cylinder. When the relative positions of the cylinder and piston are changing, to decrease the distance between the piston and the upper head of the cylinder, as indicated by Figure 3, the upper retarding spring is compressed, liquid flows downward through the passage 33, and in smaller volume through the lower crevice 38, so that the lower retarding head becomes a factor in checking upward movement of the piston relative to the cylinder.

It is obvious that the retarding springs may be otherwise anchored to the piston, to permit the described retarding function of the retarding heads. I prefer, however, to anchor the retarding spring by the means described with reference to Figures 1, 4, 5, and 6.

I am not limited to the passage 33 as the means for permitting a transferring flow of liquid from side to side of the piston.

Figures 7 to 11 show anchoring members complemental to and loosely engaged with the eyes 14 and 20, and secured to a member of the running gear and to a member of the chassis frame of the vehicle.

Figures 7 and 8 show a hook 40, loosely engaged with the cylinder eye 14, and formed on a two-part member 41, clamped to webs of a front axle 42.

Figures 9 and 11 show a sectional collar 43, clamped on the housing 44 of a rear axle 45, said collar having a loop or offset portion 46, loosely engaged with the cylinder eye 14.

Figures 7 and 8 show a bracket 47, clamped on a member 48 of the chassis frame, and provided with an eye 49, loosely engaged with the piston-rod eye 20.

Figures 9 and 10 show a differently constructed bracket clamped on the frame member 48, and constituting the preferred means for connecting the piston-rod with the chassis frame. The body of said bracket is a one piece angular member composed of a lower end portion 50, having a hook 50a, an upper end portion 51, having a perforated ear 52, and an intermediate portion 53. The bracket includes a rod or bolt 54, threaded at one end and movable in an orifice in the portion 53, the rod being provided at one end with a hook 55, and at the other end with a nut 56, rotation of which draws the hook against the frame member 48. A bolt 57 passes through the ear 52, and has a hook 58 loosely engaging the piston-rod eye 20. A set screw 59 is engaged with a tapped orifice in the body portion 53, and is adapted to be set up against the frame member 48, to draw the hook 50 against said member. The set screw is provided with a jam nut 60.

It will be seen that each of the described forms of connecting means provides a loosely jointed connection between the cylinder and the running gear, and a loosely jointed connection between the piston-rod and the chassis frame, whereby the shock absorber is adapted to conform freely to all changes in the relative positions of the running gear and the chassis frame.

The bracket shown by Figures 9 and 10 may be quickly and rigidly attached to the frame member 48, and constitutes a strong and rigid support.

I claim:

1. A shock-absorber comprising a cylinder, a piston and piston-rod movable therein, and an elongated helically coiled resilient member including an enclosed midlength portion extending through and anchored in the piston, and free end portions projecting from opposite sides of the piston toward the cylinder heads, and constituting retarding springs which are rigidly connected with each other and with the piston by the enclosed midlength portion.

2. A shock-absorber comprising a cylinder, a piston and piston-rod movable therein, the piston having a helical bore extending through it from side to side, and an elongated helically coiled resilient member including a midlength portion, enclosed in said bore and thereby anchored to the piston, and free end portions projecting from opposite sides of the piston, toward the cylinder heads, and constituting retarding springs which are rigidly connected with each other and with the piston by the enclosed midlength portion.

3. A shock-absorber comprising a cylinder, a piston and piston-rod movable therein, the piston including an annular hub member fixed to the rod and provided with a helical groove in its external surface, and an annular body member embracing, and fixed to the hub member, and provided in its inner surface with a helical groove coinciding with the groove in the hub member, and a helically coiled resilient member including a midlength portion enclosed in said grooves and anchored in the piston, and free end portions projecting from opposite sides of the piston, toward the cylinder heads, and constituting retarding springs, which are rigidly connected with each other and with the piston by the enclosed midlength portion.

4. A shock-absorber as specified by claim 3, the periphery of the body member of the piston being reduced, to form peripheral recesses at opposite sides of a narrow peripheral portion of said member, the piston including also compressible annular packing washers and annular clamping rings in said recesses, and bolts arranged to clamp the rings against the washers.

5. A shock-absorber comprising a cylinder, a piston and piston-rod movable therein, means for permitting a transferring flow of liquid from side to side of the piston, helical retarding springs anchored to the piston and extending in opposite directions therefrom, toward the cylinder heads, and retarding heads fixed to the outer ends of the springs, means being provided for permitting a flow of liquid, of smaller volume than the transferring flow, from side to side of each retarding head.

6. A shock-absorber comprising a cylinder, a piston and piston-rod movable therein, the rod being provided with a longitudinal passage extending from side to side of the piston, helical retarding springs anchored to the piston and extending in opposite directions therefrom, toward the cylinder heads, and retarding heads fixed to the outer ends of the springs, and adapted to bear separably on the cylinder heads, said retarding heads being formed to permit a flow of liquid from side to side thereof, of smaller volume than the flow permitted by the piston-rod passage.

In testimony whereof I have affixed my signature.

ANTHONY C. THOMANN.